May 19, 1970         W. L. SHEPPARD         3,512,846
VEHICULAR BRAKING SYSTEM
Original Filed Oct. 24, 1966
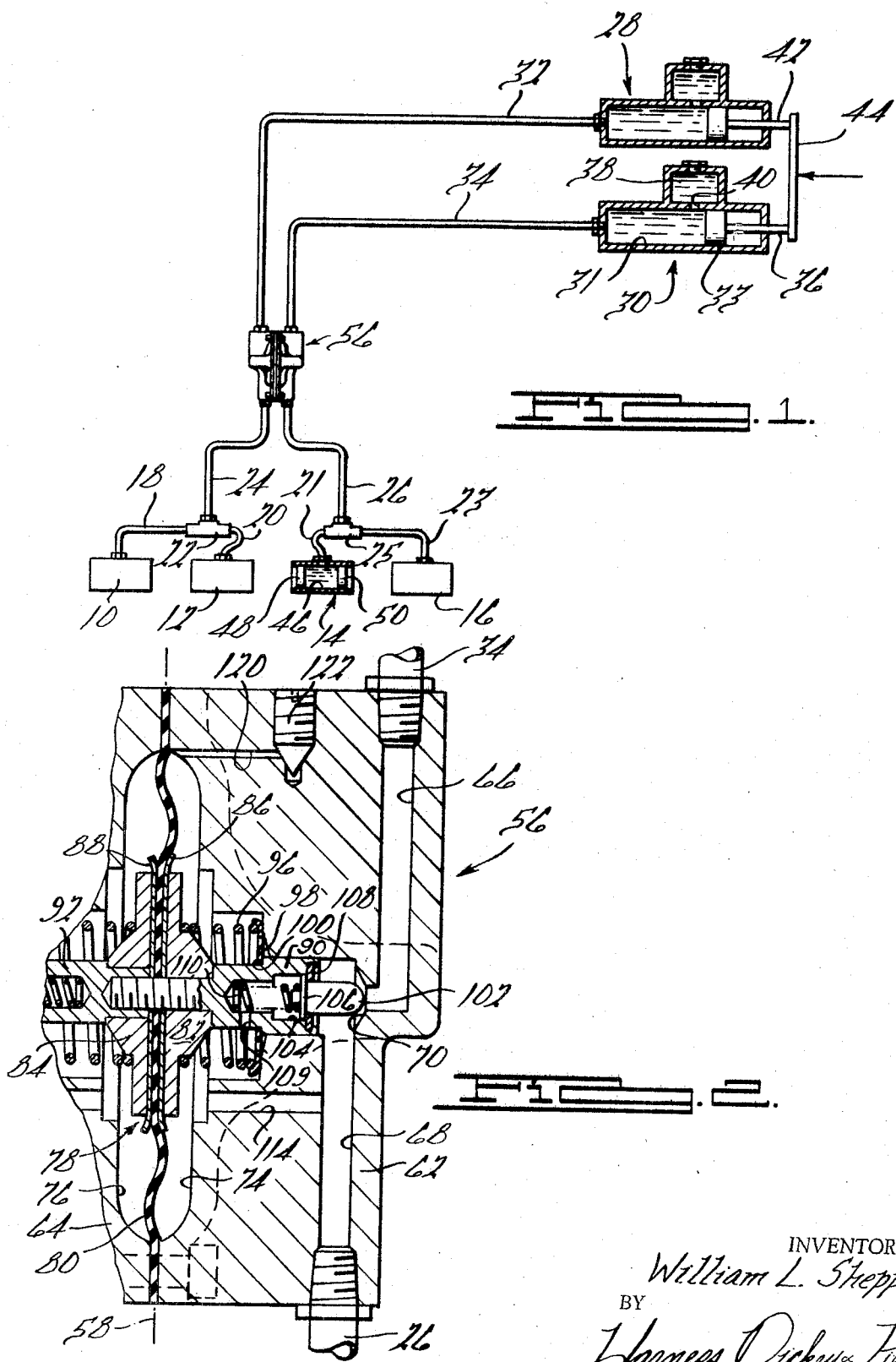
INVENTOR.
William L. Sheppard
BY
Harness, Dickey & Pierce
ATTORNEYS.

United States Patent Office 3,512,846
Patented May 19, 1970

3,512,846
VEHICULAR BRAKING SYSTEM
William L. Sheppard, 36655 Romulus Road,
Romulus, Mich. 48174
Continuation of application Ser. No. 591,668, Oct. 24, 1966. This application Aug. 22, 1968, Ser. No. 768,577
Int. Cl. B60t 17/18, 11/32
U.S. Cl. 303—84     15 Claims

ABSTRACT OF THE DISCLOSURE

A control unit for addition to a dual or split braking system to equalize or limit the differences between the hydraulic pressures in the two braking sub-systems, or to provide four-wheel braking even though one of the two master cylinders fails, or both.

---

This application is a continuation of application Ser. No. 591,668 filed Oct. 24, 1966, now abandoned.

This invention relates to vehicular braking systems and more particularly to braking systems having two or more concurrently actuated but effectively independent braking subsystems.

As a safety measure, vehicles such as passenger automobiles are being equipped with independent hydraulic systems for the front and rear wheels. While this entails, in effect, the use of an additional master cylinder, it lends assurance that the vehicle will have at least two-wheel braking even though a master cylinder or wheel cylinder fails, or even though a hydraulic line or other element of the system leaks or breaks.

The present invention pertains to the addition of a control unit to such dual braking systems to tend to equalize or limit the differences between the hydraulic pressures in the two subsystems, and also relates, in another aspect, to the achievement of four-wheel braking in such a system even though one of the two master cylinders fails.

The nature of the invention, and its objects and features, will be understood from the following description of a preferred embodiment of the invention when read in conjunction with the accompanying drawings in which:

FIG. 1 is a schematic representation of a dual braking system incorporating the principles of the present invention; and FIG. 2 is a fragmentary vertical sectional view of the sensing and control unit used in the system of FIG. 1.

The illustrative braking system of FIG. 1 is adapted for use on a four-wheeled vehicle, with each wheel being provided with suitable braking equipment including an individual one of the schematically represented hydraulic braking system wheel cylinders 10, 12, 14 and 16. These wheel cylinders are assumed to be actuated in pairs, the front wheel pair 10 and 12 being connected by individual hydraulic lines 18 and 20 and a T 22 to a line 24, and with the rear wheel pair 14 and 16 being correspondingly connected by lines 21 and 23 and a T 25 to a line 26. In prior common practice, both lines 24 and 26 would have been connected to a single hydraulic brake system master cylinder. In more recent practice, the two lines 24 and 26 are connected to individual ones of two concurrently actuated hydraulic braking system master cylinders 28 and 30, as by connecting line 24 to master cylinder 28 by line 32 and by connecting line 26 to master cylinder 30 by line 34. In that manner, two essentially independent braking subsystems are provided which, when the two master cylinders are concurrently actuated, produce dual, two-wheel braking and hence four-wheel braking. Even if one subsystem fails, two-wheel braking is available.

Master cylinder 30, which is conventional, includes a chamber or cylinder 31, a piston 33 drivable by a piston rod 36 into the chamber 32 and a reservoir 38. The reservoir 38, the chamber 32, and the remainder of the system are filled with a suitable brake fluid, usually a specially formulated liquid.

In accordance with conventional practice, the piston 36 when retracted upon the release of the brakes by the operator, assumes a position to the rear of an orifice 40 interconnecting the reservoir 38 and the chamber 31 to insure that the hydraulic subsystem is filled with brake fluid. Upon actuation of the brakes, piston 33 is driven by piston rod 36 into chamber 32, sealing orifice 40, and reducing the volume of that chamber displacing a certain volume of the brake fluid in the process and forcing it out hydraulic line 34. It is, of course, capable of developing relatively high pressures in the fluid.

Schematically illustrated master cylinder 28 which supplies fluid to line 32 is correspondingly constructed. It is intended to be actuated effectively concurrently and in step with master cylinder 30 and its piston rod 42 is schematically illustrated as being rigidly connected to piston rod 36 by a cross bar 44 against which the operator applies braking forces either directly through the brake pedal or with a power assist. Any suitable or conventional arrangement may be employed and in the common current commercial practice, the two hydraulic-pressure producing master cylinders 28 and 30 are integrated in a single housing and the two pistons are, in effect, operated in mechanical series with a single piston rod.

Provision may be made to adjust the two master cylinders in relation to one another (or to adjust the effective lengths of the two schematically illustrated piston rods) to insure that a given force applied to bar 44 (or a given movement of the bar) will produce equal pressures in the lines 32 and 34, or pressures differing from one another to a preselected degree. The need for such relative adjustability is reduced and may in many systems be obviated by the practice of the principles of the present invention.

The wheel cylinders 10, 12, 14 and 16 are conventional and the internal construction of one of those cylinders, cylinder 14, is schematically illustrated in FIG. 1. Line 21 is connected to a chamber or cylinder 46 which is bounded at its two ends by floating pistons 48 and 50. The introduction of additional hydraulic fluid into cavity 46, as a result of the actuation of master cylinder 30, drives the pistons 48 and 50 apart to activate the brakes (as by forcing conventional lined brake shoes against the brake drum) to develop frictional braking forces. To move the pistons apart a maximum distance (depending on the brake adjustment) requires the introduction into cavity 46 of a certain additional quantity of brake fluid, a quantity herein denominated the increase in volume or the displacement volume. Upon the release of the brake, a return spring assembly associated with the brake shoes urges the pistons 48 and 50 toward one another.

It is to be understood that the principles of the invention are applicable to effectively any hydraulic servo or responder unit and to effectively any type of hydraulic braking system, and the terms master cylinder and wheel cylinder are not intended in a narrow sense but rather to but connote the driving and driven elements of a fluid braking system.

In accordance with the invention, line 24 is, as before, normally connected to line 32 through an added sensing and control unit 56, and, correlatively, line 26 is normally connected to line 34 through that same unit. The manner of establishing and controlling these connections is illustrated in FIG. 2 which illustrates approximately one-half of the full unit, the unit being effectively bilaterally symmetrical about center line 58.

Unit 56 includes a pair of similar housing halves 62 and 64. Housing half 62 has a pair of passageways 66 and 68 which join at a valve seat 70. Line 34, from master cylinder 30, connects to passageway 66 and line 26, extending to the rear wheel cylinders, connects to passageway 68.

In the normal operation of the full braking system, with proper adjustment and functioning of all elements of the system, master cylinders 28 and 30 (FIG. 2) are actuated concurrently and in step to increase their output hydraulic pressures at equal rates, with hydraulic fluid flowing from master cylinder 30 through line 34, passageway 66, unobstructed valve seat 70, passageway 68, output pipe 26, and via lines 21 and 23 to the two rear wheel cylinders 14 and 16, and with hydraulic fluid from master cylinder 28 correlatively traveling through passageways corresponding to passageways 66 and 68 and past an unobstructed valve seat corresponding to valve seat 70 to the front wheel cylinders 10 and 12.

Housing halves 62 and 64 are each provided with an internal cavity or chamber 74 and 76, respectively, separated by a fluid-pressure differential force-producing means in the form of a diaphragm assembly 78. Assembly 78 includes a flexible diaphragm 80 the outer periphery of which is sandwiched between the housing halves 62 and 64, two rigid clamping plates 82 and 84 clamped on opposite sides of diaphragm 80 and a pair of thin discs 86 and 88 disposed between the respective clamping plates 82 and 84 and diaphragm 80 and peripherally projecting beyond the clamping plates. While the diaphragm 80 has been illustrated as being clamped between the two bolted-together housing halves, it will be understood that in commercial practice sealing means, such O-rings may be disposed between the diaphragm and one or both housing halves, and that the two housing halves may be rigidly secured together, to withstand the developed forces, in any suitable fashion.

Diaphragm 78 supports and actuates a valve rod assembly having one valve rod portion 90 in chamber 74 and another valve rod portion 92 in chamber 76. The two valve rod portions are secured together and, in the illustrative arrangement, also serve to secure the clamping plates 82 and 84 to the diaphragm 80 by means of a threaded engagement between the two valve rod portions and shoulders on those portions abutting the respective clamping plates. A centering spring 96, operable in compression, is disposed within cavity 74 and acts between clamp plate 82 and a spring anchoring and centering disc 98. Disc 98 is mounted upon the valve rod portion 90 and will permit sliding movement thereof to the right from its illustrated position relative to the disc 98. However, valve rod portion 90 is provided with a shoulder 100 so that leftward movement of the valve rod portion 90 from the illustrated center position will result in corresponding leftward movement of disc 98. Movement of the spring anchor disc 98 to the right from its illustrated position is prevented by its abutment with a wall of the chamber 74.

A valve 102, cooperable with valve seat 70, is carried by valve rod portion 90. In the illustrative arrangement, valve 102 is seated within an internal cavity or bore 104 in valve rod portion 90 and is provided with a shoulder 106 abuttable with a stop ring 108 mounted on the portion 90 to prevent movement of valve 102 relative to rod portion 90 to the right from its illustrated position. A light valve spring 110, disposed within the cavity 104, exerts a continuing force against valve 102 urging shoulder 106 into abutment with stop 108. Valve 102 need not make sealing engagement with the walls of cavity 104 and there normally will be leakage therearound. In addition, cavity 104 is directly connected by port 109 to cavity 74 which is in turn connected via a passageway 114 with passageway 68 so that there will normally be no pressure differential across shoulder 106.

The construction of unit 56 to the left of the centerline 60 is correlative to that above-described.

If both master cylinders 28 and 30 are operable and actuated, the pressure in passageways 66 and 68 and 114 and in cavity 74 increases in accordance with the pressure developed by master cylinder 30 and the pressure in the corresponding elements in the other half of the unit 56, including cavity 76, increases in accordance with the pressure developed by master cylinder 28. If the master cylinders are operating substantially in step, the pressures in cavities 74 and 76 remain substantially equal to one another throughout the operation of the brakes, the unit 56 is not called upon to perform its functions and the hydraulic fluid flows to the wheel cylinders as previously described. If, however, master cylinder 30 is defective or if its operation lags the operation of master cylinder 28, the pressure in cavity 76 will rise above the pressure in cavity 74, assuming the wheel cylinders and hydraulic lines are fully operational. The differential between these pressures is sensed by the effective area of the diaphragm assembly 78 and a force is developed tending to move valve rod portions 90 and 92 to the right. This movement is opposed by spring 96. If the net force exerted upon the diaphragm assembly 78 by the pressure differential between cavities 76 and 74 exceeds the opposing force exerted by spring 96 (which can be quite small if desired) diaphragm assembly 78 and valve rod portions 90 and 92 will move to the right in FIG. 2, with spring anchor disc 98 remaining in its illustrated position abutting housing half 62, and with spring 96 becoming compressed.

Due to the urging of spring 110, valve 102 moves with valve rod portion 90 into engagement with valve seat 70. When valve 102 seats against valve seat 70, continuing movement to the right of valve rod 90 produces compression of spring 110, permitting the valve rod portion 90 to overtravel with relation to valve 102.

Any such additional movement of diaphragm assembly 78, after valve 102 seats against valve seat 70, will reduce the volume of cavity 74 and increase the pressure of the fluid in that cavity as well as the fluid in passageway 114, passageway 68 and through the remainder of the subsystem including the rear wheel cylinders 14 and 16. The existence of a pressure in cavity 74 which is greater than the instant pressure in passageway 66 will establish a force, resulting from that pressure differential, tending to hold valve 102 in sealing engagement with seat 70. Assuming that the pressure in passageway 66 does not rise or does not rise at a rate faster than the rise of the pressure in cavity 76, valve 102 will remain closed, diaphragm assembly 78 will continue to move to the right as the pressure in chamber 76 continues to rise and the pressure in cavity 74 and in the front wheel brake cylinders will rise as a continuous function of the increasing pressure in cavity 76. The pressure in cavity 74 and in the front wheel cylinders 14 and 16 will be less than the pressure in cavity 76 and in the rear wheel cylinders 10 and 12 will be less than the pressure in cavity 76 and in the front wheel cylinders 10 and 12, under this assumed circumstance, by an amount determined by the force exerted by centering spring 96. This may be of any selected value. As one example, the centering spring 96 may be selected to apply a force equivalent to 25 pounds per square inch of hydraulic fluid pressure differential across the effective area of diaphragm assembly 78. The hydraulic pressure in the front wheel cylinders will be balanced or equalized with the pressure in the rear wheel cylinders within that limit.

It will be observed, however, that the diaphragm 80 itself can serve to establish a finer limit on the extent of the equalization of the pressures in the two subsystems. Thus, while in the above-discussed example, plates 82 and 84 will not move until the centering spring force is exceeded in the arrangement illustrated in the drawings, the free portion of diaphragm 80 is undulatory, that is, it is manufactured such that the annulus between the clamping plates and the housing is greater in radial dimension than necessary and so that it has preset in a serpentine conformation. As a result, any pressure differential above a limit established by the flexibility characteristics of the diaphragm results in a deflection of the noted free portion of the diaphragm to reduce the volume of the lower-pressure chamber accordingly. The limit of the pressure differential above which equalization will occur can, therefore, be very small, approaching zero.

It will be apparent that if the master cylinder 30 has, in effect, failed, the pressure differential to actuate the valve 102 will rapidly be developed across the diaphragm assembly 78, valve 102 will seat against valve seat 70 and all of the braking forces applied to the rear wheel brakes will be derived from the movement of the diaphragm assembly 70 to the right in response to the pressure differential. In other words, under that circumstance, all four wheels would be braked, with the braking power emanating solely from the master cylinder 28. Accordingly, in the event of a total failure of one of the two master cylinders, four-wheel braking will still be obtained. On the other hand, if there is but a lagging of the operation of one master cylinder behind the other, the unit will automatically equalize or balance, within predetermined limits, the hydraulic pressure applied to the two sets of wheel cylinders.

Assuming that the system is designed to have equal hydraulic pressures in the two braking systems, it will be perceived that the differential fluid pressure between the front and back wheel systems during actuation of the brakes will never exceed the force of the centering spring 96 as long as the wheel cylinders and the lines thereto are intact, and can be less. If neither subsystem is leaking, effective equalization is achieved independently of the valve 102 and its counterpart in the other housing half. However, to provide four-wheel braking in the event of the failure of one of the master cylinder units, the provision of those valves is preferred.

It should be recognized that centering spring 96, in the illustrated arrangement, is not bucking or opposing the counterpart spring in cavity 76. This may be perceived by considering the operation of the system under a situation in which the pressure in cavity 74 exceeds the pressure in cavity 76. When this pressure differential exceeds the centering spring force, diaphragm assembly 78 will move to the left carrying valve rod portion 90 therewith. Because of the abutment of the spring anchor disc 98 with shoulder 100, spring anchor disc 98 will move with valve rod portion 90 and spring 96 will be ineffective to modify or control the movement of diaphragm assembly 78.

It will be seen that if full advantage is to be taken of the capability of the braking system including unit 56 to provide four-wheel braking even if one of the master cylinders fails, each of the two master cylinders should have an adequate capacity to supply all four wheel cylinders, that is, the displacement volume of each of the master cylinders should equal the sum of the displacement volumes (as above defined) of the four wheel cylinders. Similarly, the diaphragm assembly 78 in moving in either direction to reduce the volume of the cavity 74 or 76 should be capable, within the limits of its movement, to displace a volume of hydraulic fluid equal to or greater than the displacement volume of two of the wheel cylinders. This will be fully appreciated by recognizing that if one of the master cylinders fails (or lags), unit 56 essentially acts as a hydraulically actuated master cylinder serving the wheel cylinders associated with the defective (or lagging) master cylinder.

It will be observed that the unit 56 will also function to equalize the pressures in the two subsystems, within preselected limits, if the pressure in one system falls after the brakes are fully applied.

If the hydraulic line between the master cylinder and the unit 56 is broken, the unit will function just as if the master cylinder were malfunctioning, as above described. If the hydraulic line between unit 56 and one set of the wheel cylinders fails, or if one of the wheel cylinders becomes defective so that adequate pressure cannot be developed in one of the brake subsystems, the unit will also sense that reduced pressure. Thus, if line 26 is broken, the pressure in cavity 74 will not rise whether the master cylinder 30 is operative or not and as soon as the pressure in cavity 76 exceeds that in cavity 74 by an amount determined by centering spring 96, diaphragm assembly 78 will move to the right. The pressure differential, under the circumstances, could become very large, since the pressure in cavity 74 will not increase even though the diaphragm assembly 78 is moving to the right and reducing the volume of cavity 74. To obviate the possibility of rupturing the diaphragm 80 and to limit the maximum pressure differential which can exist across the diaphragm, under that circumstance, the inner surface of cavity 74 (and correlatively of cavity 76) is positioned and conformed in relation to the diaphragm 80 to provide a full back-up for that diaphragm. Thus, the unsupported portion of diaphragm 80 will be pressed flat against the adjacent portion of the housing half 62 and an annular recess is formed in the face of the wall of cavity 74 to accommodate the clamp plate 82. It is to be observed that the radial distance between peripheral clamping annulus and the clamping washers, measured along the face of the cavity wall of the housing half, is about equal to the free difference-radius of the serpentine free annulus of the diaphragm so that the diaphragm is firmly backed and supported without significant stretching of the diaphragm material. To avoid undue tolerance requirements and to insure that the high pressure differential cannot force the portion of the diaphragm 80 immediately proximate the periphery of clamping plate 82 against the discontinuity in the housing portion surface, the above-mentioned thin discs 86 and 88 are provided. The discs may be, for example, of plastic and quite thin, as 0.010 inch thick. Their peripheries are positioned to bridge the gap, at this extreme position of movement of diaphragm assembly 78, between the clamp plate 82 and the shoulder on housing half 62 to prevent extrusion of the flexible diaphragm into that gap and hence to prevent rupture of the diaphragm at that point. Disc 88 performs a correlative function in connection with the operation of the device in the opposite direction.

To permit effective bleeding of the system in spite of the addition of unit 56 thereto, each half of the unit is provided with a bleed passageway 120 between the cavity 74 and a needle valve 122, which is opened during bleeding. To facilitate bleeding, the unit should be mounted with the passageway 120 near the top.

It will be understood that the unit can be designed to accommodate intentional differences in the hydraulic pressures in the front and rear wheel braking subsystems. It will be further understood that the unit is of general adaptability and the descriptive association of one-half of the unit with two front wheel cylinders and the other half with two rear wheel cylinders is but representative. It will further be appreciated that the system will also function in conjunction with dual master cylinders, one of which is actuated mechanically, directly or indirectly, by the operator, and the other of which is actuated hydraulically from the first. In the event that such dual master cylinders are intended to establish a preselected time and pressure relationship between the pressures in the two subsystems as by controlling the travel of the pistons before they block their respective reservoir ports (such as port 40), the need for critical tolerances or adjustments of such a dual master cylinder system can be obviated by the use of unit 56 in that those relationships can be controlled by appropriate selection of the centering springs.

Since any minor or transparent displacement of the diaphragm assembly 78 in either direction is indicative of at least a maladjustment of the relationship between the two master cylinders or an incipient failure of one of the braking subsystems, and since a major or persisting displacement of that diaphragm assembly can indicate a failing braking subsystem, it will be recognized that electrical contacts or other sensing means can be associated with the unit to sense either or both of those displacements of the diaphragm unit 78 in either direction to provide a signal indicative of the trouble condition.

It will further be observed that in this improved system, the supplying of hydraulic fluid under pressure to all four wheel cylinders from, in effect, one master cylinder upon failure of the other master cylinder, will or can in appropriate master cylinder systems, result in approximately twice the brake pedal movement when one master cylinder fails. This permits the failure of one of the master cylinders to be detected and signalled simply by detecting excessive brake pedal travel, as by means of limit-switch contacts accociated with the brake pedal or the master cylinder piston rod. That same senser or detector would or could also alarm the driver to brake maladjustment or low brake fluid.

It will further be appreciated that the system will also function in conjunction with dual master cylinders one of which is actuated mechanically, directly or indirectly, by the operator, and the other of which is actuated, normally, hydraulically from the first, as is common current practice. In the event that such dual master cylinders are intended to establish a preselected time and pressure relationship between the pressures in the two subsystems as by controlling the travel of the pistons before they block their respective reservoir ports (such as port 40), the need for critical tolerances or adjustments of such a dual master cylinder system can be obviated by the use of unit 56 in that those relationships can be controlled by appropriate selection of the centering springs. It will also be observed that the equalization features of the present unit make it feasible to utilize dual master cylinders which are mechanically connected in series, as by using a unitary piston rod with the two piston units formed thereon.

It will be appreciated that a fluid-pressure-differential force producing means different from the presently preferred diaphragm 80, such as a spool valve, can be used if desired.

While it will be apparent that the embodiments of the invention herein disclosed are well calculated to fulfill the objects of the invention, it will be appreciated that the invention is susceptible to modification, variation, and change without departing from the proper scope or fair meaning of the subjoined claims.

What is claimed is:

1. In a braking system for a multiple-wheel vehicle having two concurrently actuated but independent braking subsystems each including an individual hydraulic braking system master cylinder both actuated as a result of operational movement of a single brake pedal, hydraulic braking system wheel cylinders individual to certain of the wheels and individual to that master cylinder, and hydraulic lines interconnecting the master cylinder and those wheel cylinders individual thereto, each of the wheel cylinders requiring a certain increase in the volume of the hydraulic fluid therein for actuation from a fully released condition to a fully actuated condition, with each master cylinder being normally capable, when actuated, of applying hydraulic fluid under pressure to the wheel cylinders individual thereto and with the two master cylinders being actuated concurrently upon actuation of the single brake pedal, the combination of a housing defining a pair of chambers, movable hydraulic pressure-differential-responsive force transmitting means between and separating and defining a wall portion of each of said chambers, means connecting one of said chambers in series in the hydraulic line in one of the braking subsystems between the master cylinder and the wheel cylinders individual thereto, means connecting the other one of said chambers in series in the hydraulic line of the other one of said braking subsystems between the master cylinder and the wheel cylinders individual thereto, said force transmitting means being moved by the pressure differential and reducing the size of the lower-pressure chamber as a result of such movement, the volume of each of said chambers, when the pressure of the hydraulic fluid therein is effectively equal to the pressure of the hydraulic fluid in the other chamber, being at least substantially equal to the sum of the said increases of the volume of all of the wheel cylinders in the braking subsystem individual to that chamber, said force transmitting means being capable in the course of its movement of forcing a quantity of hydraulic fluid into the hydraulic line extending from either chamber to the wheel cylinders individual to said either chamber sufficient to actuate said wheel cylinders from a fully released condition to a fully actuated condition.

2. The combination of claim 1 in which said force transmitting means is moved toward the lower-pressure chamber in response to the existence of a pressure differential exceeding a preselected amount between said chambers, and further including first and second valve means associated with and individual to respective ones of said chambers and to the master cylinder associated with that respective chamber, with the one of said valve means associated with said lower-pressure chamber being effective upon such movement to block the lower-pressure chamber from the master cylinder connected thereto.

3. The combination of claim 2 in which said one of said valve means senses and is movable in response to the pressure differential between the chamber with which it is associated and the master cylinder with which it is associated.

4. The combination of claim 3 in which said one of said valve means upon blocking the master cylinder is responsive to the pressure differential between the chamber with which said valve is associated and the master cylinder with which said valve is associated to increase the blocking force.

5. The combination of claim 4 in which said pressure-differential-responsive force transmitting means effectively equalizes the pressures in the two braking subsystems within preselected limits.

6. The combination of claim 5 in which the movement of said pressure-differential-responsive force transmitting means reduces the size of the lower-pressure chamber to supply hydraulic fluid under pressure to the wheel cylinders associated therewith.

7. The combination of claim 6 further including spring means acting on said pressure-differential-responsive force transmitting means and opposing movement thereof from the position assumed thereby when the pressure-differential thereacross is zero.

8. The combination of claim 7 wherein said spring means comprises a pair of compression springs engaging opposite faces of said force transmitting means.

9. The combination of claim 8 wherein each of said springs opposes movement of said force transmitting means toward that spring, and further including means for disabling each of said springs from moving said force transmitting means away from the position assumed by said force transmitting means when the pressures in the two chambers are equal.

10. In a braking system for a multiple-wheel vehicle having two concurrently actuated but independent braking subsystems each including an individual hydraulic braking system master cylinder both actuated as a result of operational movement of a single brake pedal, hydraulic braking system wheel cylinders individual to certain of the wheels and individual to that master cylinder, and hydraulic lines interconnecting the master cylinder and those wheel cylinders individual thereto, each of the wheel cylinders requiring a certain increase in the volume of the hydraulic fluid therein for actuation from a fully released condition to a fully actuated condition, with each master cylinder being normally capable, when actuated, of applying hydraulic fluid under pressure to the wheel cylinders individual thereto and with the two master cylinders being actuated concurrently upon actuation of the single brake pedal, the combination of a housing defining a pair of chambers, movable hydraulic pressure-differential-responsive force transmitting means between and separating and defining a wall portion of each of said chambers, means connecting one of said chambers in series in the hydraulic line in one of the braking subsystems between the master cylinder and the wheel cylinders individual thereto, means connecting the other one of said chambers in series in the hydraulic line of the other one of said braking subsystems between the master cylinder and the wheel cylinders individual thereto, spring means acting on said pressure-differential-responsive force transmitting means and opposing movement thereof from the position assumed thereby when the pressure-differential thereacross is zero, said spring means comprising a pair of compression springs engaging opposite faces of said force transmitting means, each of said springs opposing movement of said force transmitting means toward that spring whenever the pressures in the two chambers are unequal, and means effective whenever the pressures in the two chambers are unequal for disabling each of said springs to exert forces moving said force transmitting means away from the position assumed by said force transmitting means when the pressures in the two chambers are equal.

11. In a braking system for a multiple-wheel vehicle having two concurrently actuated but independent braking subsystems each including an individual hydraulic braking system master cylinder both actuated as a result of operation of a single brake pedal, hydraulic braking system wheel cylinders individual to certain of the wheels and individual to that master cylinder, and hydraulic lines interconnecting the master cylinder and those wheel cylinders individual thereto, each of the wheel cylinders requiring a certain increase in the volume of the hydraulic fluid therein for full actuation, with each master cylinder being normally capable, when actuated, of applying hydraulic fluid under pressure to the wheel cylinders individual thereto and with the two master cylinders being actuated concurrently upon actuation of the single brake pedal, the combination of a housing defining a pair of chambers, movable hydraulic pressure-differential-responsive force transmitting means between and separating and defining a wall portion of each of said chambers, means connecting one of said chambers in series in the hydraulic line in one of the braking subsystems between the master cylinder and the wheel cylinders individual thereto, means connecting the other one of said chambers in series in the hydraulic line of the other one of said braking subsystems between the master cylinder and the wheel cylinders individual thereto, said force transmitting means being moved toward the lower-pressure chamber in response to the existence of the pressure differential exceeding a preselected amount between said chambers, and valve means individual to each of said chambers, the one of said valve means which is individual to the lower-pressure chamber being effective upon such movement of said force transmitting means to block the lower-pressure chamber from the master cylinder connected thereto, each of said valves sensing and being responsive to the pressure differential between the chamber to which it is individual and the master cylinder to which it is individual.

12. The combination of claim 11 in which each of said valves is responsive to the pressure differential between the chamber with which it is associated and the master cylinder with which it is associated and in which the one of said valves which is individual to said lower-pressure chamber is effective upon said blocking to sense and respond to the pressure differential between the chamber with which said valve is associated and the master cylinder with which said valve is associated to vary the blocking force.

13. The combination of claim 3 in which said one of said valve means is effective during blocking to sense and respond to the pressure differential between the chamber with which said valve is individual and the master cylinder to which said valve is individual to vary the blocking force.

14. In a braking system for a vehicle having a plurality of wheels with a hydraulic braking system wheel cylinder for each of the plurality of wheels, the combination of a first braking subsystem including a first hydraulic braking system master cylinder connected to and supplying hydraulic fluid under pressure when actuated to but certain of the wheel cylinders, a second separate hydraulic subsystem including a second braking system master cylinder actuatable concurrently with said first hydraulic braking system master cylinder and connected to and supplying hydraulic fluid under pressure when actuated to but certain other of the wheel cylinders, said master cylinders being concurrently actuated upon the operation of a single pedal, and means for providing braking of all of the plurality of wheels even if one of said master cylinders has failed comprising actuating means effective when said one of said master cylinders has failed and actuated by the other one of said master cylinders for effectively blocking said one of said master cylinders and for supplying hydraulic fluid under pressure to the wheel cylinders in the braking subsystem which includes said one master cylinder for actuating those wheel cylinders, said actuating means including a first portion movable in response to changes of the pressure differential between said subsystems, and valve means movable by said first portion for blocking said one of said master cylinders from the wheel cylinders in the braking subsystem which includes said one of said master cylinders and also effective during said blocking to sense and vary the blocking in response to changes of the pressure differential between said one of said master cylinders and said wheel cylinders in the braking subsystem which includes said one of said master cylinders.

15. The combination of claim 14 in which said valve means is movable by said first portion over a range of movement and is also movable relative to said first portion over a range of movement.

References Cited

UNITED STATES PATENTS

| 2,710,620 | 6/1955 | Watson. |
| 2,930,391 | 3/1960 | Bass et al. |
| 3,021,677 | 2/1962 | Miller. |
| 3,148,364 | 9/1964 | Engels et al. |

FOREIGN PATENTS

| 333,365 | 8/1930 | Great Britain. |

MILTON BUCHLER, Primary Examiner

J. J. McLAUGHLIN, JR., Assistant Examiner

U.S. Cl. X.R.

60—54.5; 188—151, 152; 303—6